(12) United States Patent
Reynolds et al.

(10) Patent No.: US 10,248,917 B1
(45) Date of Patent: Apr. 2, 2019

(54) SYSTEM AND METHOD FOR DEVELOPING AND UTILIZING A CONTACTABILITY PROFILE

(75) Inventors: Anthony Paul Reynolds, Richmond, VA (US); Daniel J. Welker, Boise, ID (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 1312 days.

(21) Appl. No.: 11/251,331

(22) Filed: Oct. 14, 2005

Related U.S. Application Data

(60) Provisional application No. 60/618,704, filed on Oct. 14, 2004.

(51) Int. Cl.
*G06Q 10/00* (2012.01)
*G06Q 10/06* (2012.01)
*H04M 3/42* (2006.01)

(52) U.S. Cl.
CPC .. *G06Q 10/06311* (2013.01); *H04M 3/42374* (2013.01)

(58) Field of Classification Search
CPC ........ G06Q 10/00; G06Q 30/02; G06Q 50/01; G06Q 10/06311; H04M 3/42374
USPC .............................. 705/10, 7.11–7.42; 12/10
See application file for complete search history.

(56) References Cited

U.S. PATENT DOCUMENTS

| | | |
|---|---|---|
| 3,657,702 A | 4/1972 | Stephenson, Jr. |
| 4,331,837 A * | 5/1982 | Soumagne .............. H04J 3/175 704/215 |
| 5,072,400 A | 6/1991 | Baji et al. |
| 5,053,749 A | 10/1991 | Weiss |
| 5,420,403 A | 5/1995 | Allum et al. |
| 5,649,118 A | 7/1997 | Carlisle et al. |
| 5,742,674 A * | 4/1998 | Jain ........................ H04M 3/48 379/111 |
| 5,787,253 A | 7/1998 | McCreery et al. |
| 5,794,210 A * | 8/1998 | Goldhaber et al. ......... 705/14.69 |
| 5,802,161 A * | 9/1998 | Svoronos et al. ....... 379/216.01 |
| 5,848,396 A | 12/1998 | Gerace |
| 5,889,799 A | 3/1999 | Grossman et al. |
| 5,918,207 A | 6/1999 | McGovern et al. |
| 5,936,523 A | 8/1999 | West |
| 5,948,061 A | 9/1999 | Merriman et al. |
| 5,991,735 A | 11/1999 | Gerace |

(Continued)

FOREIGN PATENT DOCUMENTS

| | | | |
|---|---|---|---|
| GB | 341603 A * | 1/1931 | ............... H04Q 3/58 |
| GB | 1235654 A * | 6/1971 | ............... H04Q 5/24 |
| WO | WO 00/13373 | 3/2000 | |

OTHER PUBLICATIONS

United Parcel Service of America, Inc. "Outbound Visibility"; http://www.ups.com/content/us/en/register/reasons/outbound.html.

(Continued)

*Primary Examiner* — Jonathan G Sterrett
(74) *Attorney, Agent, or Firm* — Troutman Sanders LLP; Christopher J. Forstner; John A. Morrissett

(57) ABSTRACT

Systems and methods for developing and utilizing a contactability profile are disclosed. Contact information may be managed by receiving activity data associated with an entity, processing the received activity data, generating at least one contactability profile associated with the entity based upon a result of the processing, and storing the generated contactability profile.

20 Claims, 10 Drawing Sheets

(56) References Cited

U.S. PATENT DOCUMENTS

| | | | |
|---|---|---|---|
| 6,073,112 A | 6/2000 | Geerlings | |
| 6,098,052 A | 8/2000 | Kosiba et al. | |
| 6,115,597 A | 9/2000 | Kroll et al. | |
| 6,119,160 A | 9/2000 | Zhang et al. | |
| 6,249,775 B1 | 6/2001 | Freeman et al. | |
| 6,611,881 B1 | 8/2003 | Gottfurcht et al. | |
| 6,614,895 B1 | 9/2003 | Impey et al. | |
| 6,631,360 B1* | 10/2003 | Cook | 706/20 |
| 6,651,099 B1 | 11/2003 | Dietz et al. | |
| 6,658,393 B1 | 12/2003 | Basch et al. | |
| 6,685,088 B1 | 2/2004 | Royer et al. | |
| 6,721,617 B2 | 4/2004 | Kato et al. | |
| 7,885,401 B1* | 2/2011 | Mullen | H04M 3/5158 379/265.05 |
| 7,974,849 B1* | 7/2011 | Begole et al. | 705/1.1 |
| 2001/0011243 A1 | 8/2001 | Dembo et al. | |
| 2001/0027430 A1 | 10/2001 | Sabourian | |
| 2001/0034678 A1 | 10/2001 | Lerner et al. | |
| 2001/0051920 A1* | 12/2001 | Joao | G06Q 20/04 705/41 |
| 2002/0010679 A1* | 1/2002 | Felsher | G06F 19/322 705/51 |
| 2002/0019852 A1 | 2/2002 | Bahar | |
| 2002/0032612 A1 | 3/2002 | Williams et al. | |
| 2002/0035543 A1 | 3/2002 | Shedd et al. | |
| 2002/0042764 A1 | 4/2002 | Gardner et al. | |
| 2002/0073329 A1 | 6/2002 | Brombal | |
| 2002/0116245 A1 | 8/2002 | Hinkle et al. | |
| 2002/0116264 A1 | 8/2002 | Fiedelson et al. | |
| 2002/0116331 A1 | 8/2002 | Cataline | |
| 2002/0128908 A1 | 9/2002 | Levin | |
| 2002/0128960 A1* | 9/2002 | Lambiotte et al. | 705/38 |
| 2002/0130777 A1 | 9/2002 | Besnard | |
| 2002/0137555 A1 | 9/2002 | Posey | |
| 2002/0147625 A1* | 10/2002 | Kolke, Jr. | 705/9 |
| 2003/0009385 A1* | 1/2003 | Tucciarone | G06Q 10/107 705/26.1 |
| 2003/0028467 A1 | 2/2003 | Sanborn | |
| 2003/0041020 A1* | 2/2003 | Kogler et al. | 705/38 |
| 2003/0050874 A1 | 3/2003 | Sesak | |
| 2003/0050882 A1 | 3/2003 | Degen | |
| 2003/0055791 A1 | 3/2003 | Bodie | |
| 2003/0093289 A1 | 5/2003 | Thornley et al. | |
| 2003/0154293 A1* | 8/2003 | Zmolek | H04L 63/08 709/228 |
| 2003/0177017 A1* | 9/2003 | Boyer et al. | 705/1 |
| 2003/0220841 A1* | 11/2003 | Maritzen | 705/26 |
| 2003/0225662 A1 | 12/2003 | Horan et al. | |
| 2003/0225663 A1 | 12/2003 | Horan et al. | |
| 2003/0233278 A1 | 12/2003 | Marshall | |
| 2004/0003042 A1* | 1/2004 | Horvitz | G06Q 10/109 709/204 |
| 2004/0019518 A1 | 1/2004 | Abraham | |
| 2004/0024608 A1 | 2/2004 | Saenz et al. | |
| 2004/0024703 A1 | 2/2004 | Roskind | |
| 2004/0041794 A1* | 3/2004 | Kidode | G06F 1/163 345/173 |
| 2004/0094624 A1* | 5/2004 | Fernandes et al. | 235/449 |
| 2004/0098274 A1* | 5/2004 | Dezonno | H04M 3/523 706/21 |
| 2004/0117301 A1* | 6/2004 | Fujisawa | G06Q 20/04 705/39 |
| 2005/0015432 A1* | 1/2005 | Cohen | 709/201 |
| 2005/0033653 A1* | 2/2005 | Eisenberg | G06Q 20/12 705/26.8 |
| 2005/0091272 A1* | 4/2005 | Smith | G06Q 10/06 |
| 2005/0097046 A1* | 5/2005 | Singfield | 705/42 |
| 2005/0132004 A1* | 6/2005 | Horvitz et al. | 709/204 |
| 2005/0132006 A1* | 6/2005 | Horvitz et al. | 709/204 |
| 2005/0137949 A1 | 6/2005 | Rittman | |
| 2006/0069686 A1* | 3/2006 | Beyda et al. | 707/10 |
| 2008/0015903 A1* | 1/2008 | Rodgers | 705/3 |

OTHER PUBLICATIONS

Fedex; "FedEx Insight Tour", https://insight.fedex.com/fedexiv/us/tour/index.html?.

USPS; "Track & Confirm FAQs"; http://www.usps.com/shipping/trackandconfirmfaqs.htm.

Anita J. Bizzotto and Charles E. Bravo; "Confirm Service: Intelligent Mail Technology 24/7"; http://www.postalproject.com/documents.asp?grID=364&d_ID2471; May 15, 2004.

PrWeb, "Sage Telecom teams with iGneiTe to implement Planet Confirm" http://www.prweb.com/releases/2003/7/prweb71168.php; Jun. 30, 2003.

ARMAMonitor FAQ; Jul. 11, 2003.

NCP Solutions—Press Releases; "NCP Solutions Extends Product and Service Offering to Its Customers with Firstlogic's Postalsoft Solutions" http://www.ncpsolutions.com/press.html; Jul. 11, 2003.

"U.S. Postal Service Confirm's that "It's in the Mail"" http://www.ocassociates.net/CS_Confirm.htm.

"Welcome to Grayhair Software, Inc." http://www.grayhairsoftware.com/pcs.html.

Harrington, Mark. "Mail Tracking System Proposed," Newsday, http://www.newsday.com/business/printedition/ny-bzpost172418497oct17.story; Oct. 17, 2001.

* cited by examiner

SYSTEM AND METHOD FOR DEVELOPING AND UTILIZING A CONTACTABILITY PROFILE

REFERENCE TO RELATED APPLICATIONS

This application claims the benefit of provisional U.S. Patent Application No. 60/618,704, entitled SYSTEM AND METHOD FOR DEVELOPING AND UTILIZING A CONTACTABILITY PROFILE, filed Oct. 14, 2004, which is incorporated herein by reference in its entirety.

FIELD

This application relates to a system and method for developing and utilizing a contactability profile, and in particular to developing and utilizing a contactability profile that may be utilized to efficiently and reliably contact an entity.

BACKGROUND

Effective communication is a key component to maintaining a successful business or other type of organization. In many industries, the ability to communicate with customers, consumers, or other companies is of great importance. For example, lenders must be capable of maintaining contact with borrowers, manufacturers must be capable of maintaining contact with suppliers, and shipping companies must be capable of making deliveries that require confirmation, such as a signature of the receiving party.

As a result, considerable effort is put into providing effective communication options and capabilities. For example, many businesses are now capable of communicating using a variety of channels, including traditional methods such as telephone, personal visit, or letter, as well as newer channels such as email, Internet (e.g., Internet relay chat ("IRC"), instant messaging ("IM")), or mobile text-messaging (e.g., a short message service ("SMS")).

Nevertheless, it has been estimated that companies spend millions of dollars per year in wasted time and resources related to unsuccessful contact attempts. Therefore, a need exists for methods and systems that increase the efficiency and reliability of contacts.

SUMMARY

An aspect of the present application provides for a method for managing contact information, comprising receiving activity data associated with an entity, the activity data including at least one of transaction data or Internet service provider log-in data, processing the received activity data, generating at least one contactability profile associated with the entity based upon a result of the processing, and storing the generated contactability profile.

A further aspect of the present application provides for a method of utilizing a contact application, comprising receiving activity data, the activity data including at least one of transaction data or internet service provider log-in data, generating a contactability profile, and performing a contact action based upon the received contactability profile.

A further aspect of the present application provides for a system for managing contact information, comprising at least one memory unit and at least one processing unit, wherein the processing unit: receives activity data associated with an entity, the activity data including at least one of transaction data or internet service provider log-in data, processes the received activity data, generates at least one contactability profile associated with the entity based upon a result of the processing and stores the generated contactability profile.

BRIEF DESCRIPTION OF THE DRAWINGS

Embodiments of the present invention are illustrated by way of example in the accompanying figures, in which like reference numbers indicate similar elements, and in which.

DETAILED DESCRIPTION

Figure 1:
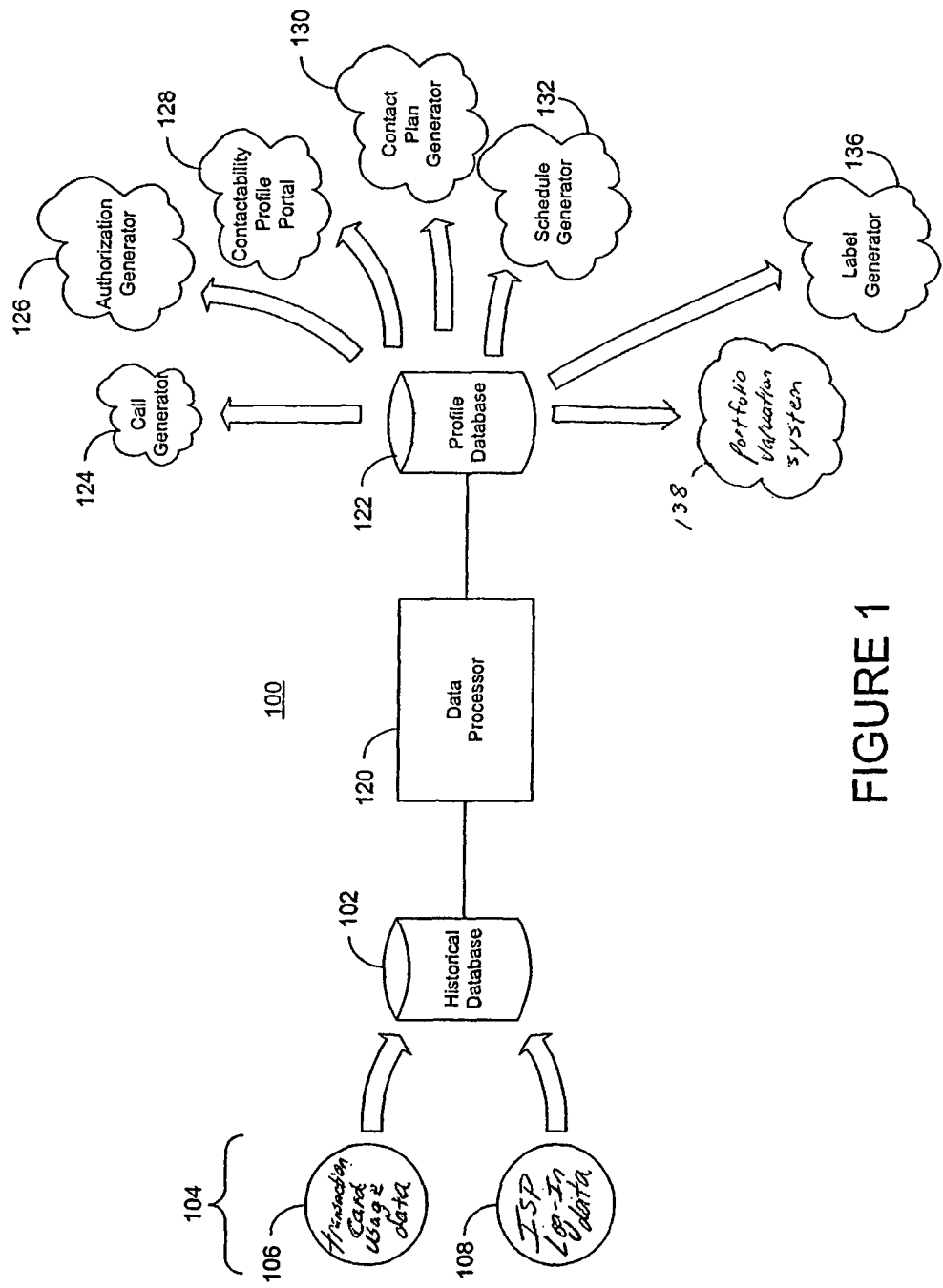
FIG. 1 shows a block diagram illustrating a contactability profiling system.

A contactability profiling system 100 associated with the present disclosure is shown in FIG. 1. The contactability profiling system 100 may be used to capture and store historical activity data, such as data and information associated with transaction card activity and Internet service provider ("ISP") log-in and/or usage activity by an entity, such as a user, a customer, an account holder, and/or a prospective account holder. The historical activity data may be processed to create a contactability profile. The contactability profile may be created for any type of entity, including individuals, businesses, and groups of individuals, for instance households, families, religious organizations, charitable organizations, academic organizations, and the like. The contactability profile may provide information that may include an indication of how accessible and/or available an entity is to be contacted. The contactability profile may additionally include an indication of preferred channels and/or preferred times for contacting the entity.

The contactability profile may be utilized in a variety of ways and for a variety of applications. For example, a contactability profile may be utilized for scheduling a direct contact, such as a delivery of a parcel, a contact via a telephone, or a personal visit. Alternatively, the contactability profile may be utilized for enhancing a valuation of a portfolio, for example a debt portfolio. These and other examples are discussed in greater detail below. In view of the following discussion, it will be appreciated by those skilled in the art that there are numerous ways the contactibility profiling system 100 can be implemented.

The term "channel" and/or "channels" as used in the present application is intended to include any form or mechanism for communication. Examples of such form or mechanism for communication include, but are not limited to, contact by land-line telephone or cellular telephone, including telephone calls placed by a person or by an interactive voice system, by letter, by facsimile, by electronic mail, by Internet (e.g., IRC or IM), mobile text-messaging (e.g., SMS), personal visit, or via an interactive electronic system. Examples of interactive electronic systems include automatic teller machines ("ATMs"), interactive cable or satellite receivers, and interactive television program recording systems, such as digital video recorders ("DVRs") and "TiVo" devices.

In FIG. 1, a historical database 102 may receive activity data from one or more data sources 104, and the activity data may be used to construct a contactability profile. Examples of useful activity data as shown in FIG. 1 include transaction data, such as data related to use of a transaction card or to use of an account number associated with a transaction card, for instance by an account holder or prospective account holder. The activity data may be related to use of a transaction card or associated account number, including transaction card usage data 106, and/or may include other data such as ISP log-in data 108 indicating one or more log-ins or the like by the account holder or the prospective account holder.

When the entity includes more than one individual (e.g., a household, business, or organization), data collected related to individuals within the entity may be associated with the entity within the database 102 based on common characteristics. In an exemplary embodiment, for example, when an entity is a household, address matching or information for individuals sharing a joint account or membership can be used to associate individuals with that particular household (i.e., individuals residing at a given address are part of the household at that address). It will be appreciated that these are but a few examples of data resources that can be used. In practice, data may be collected from any type of available resource without departing from the spirit and scope of the concepts discussed herein.

Referring to FIG. 1, a data processor 120 may be provided for processing data to derive a contactability profile. In an exemplary embodiment, the data processor 120 may be in communication with the historical database 102 to allow the data processor 120 to retrieve data from the historical database 102 for processing. The data processor 120 may also be in communication with a profile database 122 to allow the data processor 120 to store and/or modify contactability profiles in the profile database 122. The profile database 122 may serve as a resource for and be in communication with one or more of a variety of different types of systems and applications including a telephone call generator 124, an authorization request generator 126, a contactability profile portal 128, a contact plan generator 130, a schedule generator 132, a label (e.g., shipping label) generator 136, and/or a portfolio valuation system 138.

The various components of the system 100 may communicate via any type of network, including wired and/or wireless communication lines utilizing wired and/or wireless interfaces. Suitable networks are well known to those skilled in the art. Communication of data may also include cases where data are transferred manually (e.g., data entry personnel entering data directly into the database 102 and/or 122) or pseudo-manually (e.g., scanning a document in order to convert text or other coding into digital data).

For example, in some exemplary embodiments data from the data sources 104 may be transferred to the historical database 102 via a public communication network such as the Internet, and the transferal may be wholly or partially performed utilizing a virtual private network ("VPN"). Additionally, the data transferal may include communication within a single element or may include communication between independent devices. For instance, data may be transferred between the data processor 120 and the databases 102 and 122 via a system bus (e.g., where the database 102 and/or 122 and the data processor 120 may be parts of a single computer) or via an intranet (e.g., where the database 102 and/or 122 are run in one or more servers and the data processor 120 may be a client computer). The data stored in the profile database 122 may be accessed via public and/or private communication networks, including intranets, extranets, or the Internet.

In other exemplary embodiments, the entire system 100 can be located on and/or within a single computer device. For example, the data sources 104 may include a software application or applications that store data in the historical database 102. Likewise, the data processor 120 may include a software application that fetches data from the historical database 102, processes the fetched data, and then stores the processed data in the profile database 122. Data from the profile database 122 may then be fetched by another software application, such as any of those included in items 124-138 in FIG. 1.

In an alternative exemplary embodiment, the databases 102 and 122 may be one or more database applications located on one or more database servers while the data processor 120 may include a software application on a client computer that may be networked to the one or more database servers. In a further exemplary embodiment, the entire contactibility profile system 100 may be implemented as a single software application that includes any number of software modules which may interface and/or interact. The software modules may all reside on a single computer device and/or server, or may be dispersed and run amongst any number of computers and/or servers.

The databases 102 and 122 can be any type of database, for example, a flat file database, relational database, object database, or object relational database. For example, in some embodiments the databases 102 and 122 can be object relational databases, such as those commercially available from relational database providers including Oracle or Sybase. The databases 102 and 122 may be organized and accessed through use of a standard language, such as Object Query Language ("OQL") or Structured Query Language ("SQL") for communication with other components of the system 100. The databases 102 and 122 can use an Application Programming Interface ("API") in place of or in combination with the OQL or SQL for allowing other applications, such as the data processor 120, to control the data stored therein.

Figure 2:
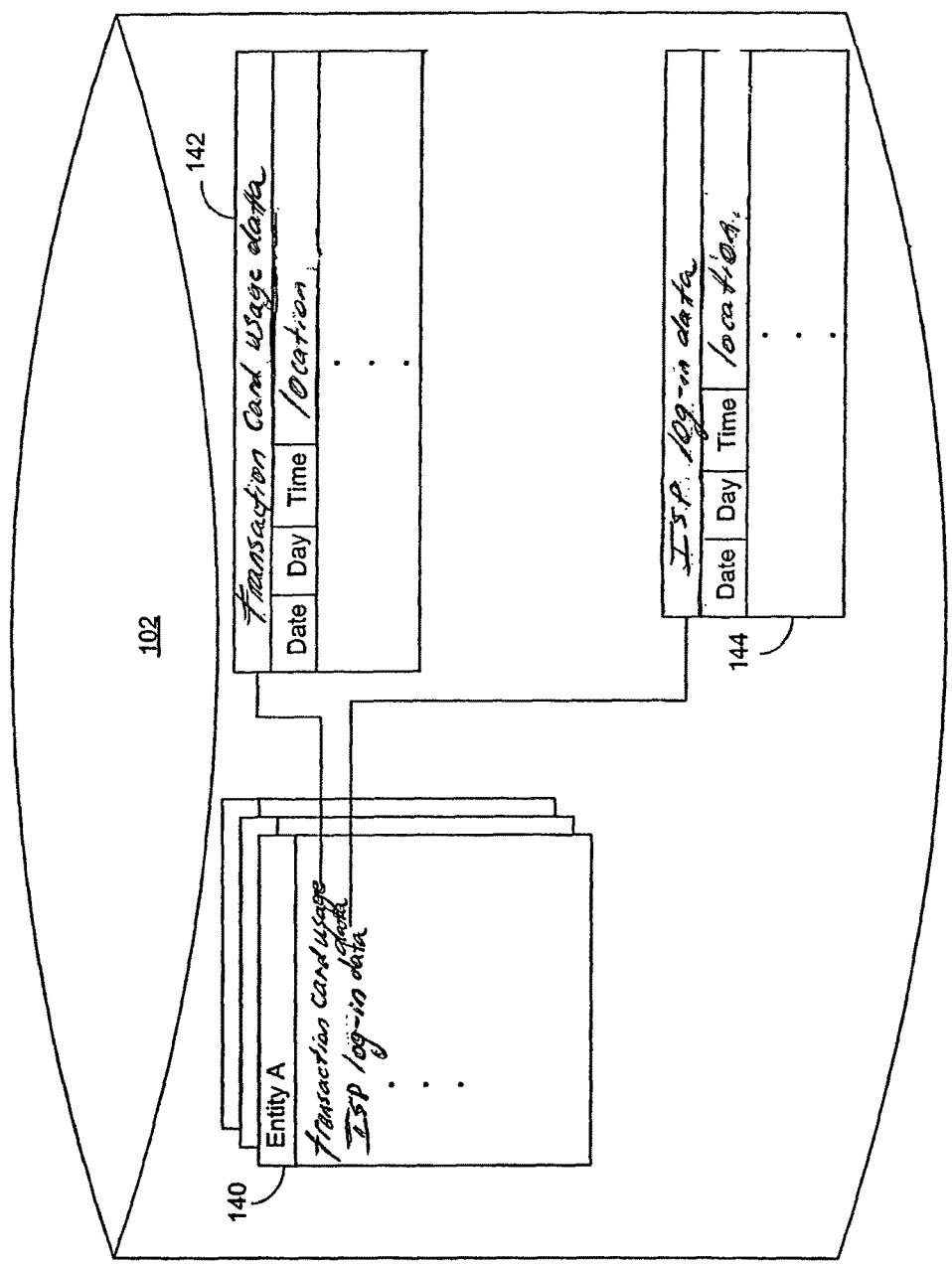
FIG. 2 shows a block diagram illustrating an example of historical data stored in a historical database.

Referring to FIG. 2, the historical database 102 may be used to store historical data. The historical database 102 may store the data in a form of data records in a plurality of tables, such as table 140 shown in FIG. 2. In the embodiment shown in FIG. 2, the table 140 may include a top-level table associated with a particular entity, identified for the purposes of illustration in the present application as "Entity A". The table 140 may also include categories of historical data associated with Entity A that may be used for generating a contactability profile.

In the embodiment illustrated in FIG. 2, the historical activity data may include categories for transaction data, for example transaction card usage data, and for ISP log-in activity and/or usage data. In an exemplary embodiment, the table 140 may include additional categories of data including account data and/or third-party data. The transaction data, such as the transaction card usage data, may be provided in transaction card usage table 142, and may include transaction identification data such as a date, a day (e.g., day of the week, weekday/weekend, etc.), a time, and a location where the transaction card and/or transaction account number was used by Entity A.

The transaction card usage data may include data associated with usage of a debit card, a credit card, a smart card, a gift card, a incentive card, a discount card, a calling card, a membership card, a rewards card, a merchant loyalty card, and/or a stored-value card. Examples of sources for the transaction card usage data can include data retrieved or received as a result of the card being used in connection with a transaction, for example in association with an authorization request received and/or approved for making a purchase of goods or services. The purchase transaction relating to goods and/or services may include purchases of merchandise or making a telephone call. The transaction card usage data may alternatively be associated with, for example, a request for claiming a benefit such as a discount or access to an event or facility, and the like. The transaction card usage data may include records associated with card usage by Entity A, including fields for a date of transaction, a transaction time, a transaction day of week, and/or transaction location information.

The transaction location information can, for example, include an indication of a specific address, business, merchant, and/or event associated with the transaction. Alternatively, the transaction location information may be indicative of general location information such as whether the usage occurred at the primary residence of Entity A. In an exemplary embodiment, for example, the transaction location information may be associated with a purchase transaction performed at a location of a merchant, a purchase transaction performed using a transaction card via the Internet, and the like. The transaction location information may thereby be indicative of whether Entity A is local to a primary residence or not, for example to indicate whether Entity A is at home or away on business and/or vacation at the time of the performance of the transaction.

As described herein, information related to card usage can be utilized to determine whether a particular entity can be contacted or cannot be contacted at a particular time, at a particular location, and/or via a particular communication medium. For example, the determination may indicate that the entity cannot be contacted at a home phone number when the entity is away on business or vacation. Furthermore, a determination can be made whether an entity is communication channel-specific, and if so, which particular communication channel may be utilized to contact the respective entity. For instance, if a payee is identified as an ISP, the determination may indicate that a communication method such as e-mail may be used to contact the respective entity who submitted payment to the ISP.

ISP log-in data may be provided in ISP log-in data table 144 and may include data related to log-in activities performed by the entity. The ISP log-in data may include, for example, data associated with a date, a day of week, a time, and/or a location from which a respective account holder entity has logged-in. More particularly, the ISP log-in data may be accumulated and monitored to determine, for instance, when Entity A may be available to be contacted and/or when Entity A may be located at a particular location.

In an exemplary embodiment, for example, the entity may be contacted based upon the determination of location, and may be contacted at the particular location on the same day Entity A is using the respective communication device to log-in, such as a computer or the like. Alternatively, the entity may be contacted on another day, based upon a determination of a probability that Entity A will then be available at that particular location and likely using the communication device to log-in. The probability of Entity A being located at the particular location may be calculated utilizing the accumulated ISP log-in data.

In an exemplary embodiment, for instance, the probability may be determined by identifying a number of log-ins by Entity A within a predetermined time period, such as a week, a month, and the like. A location of each log-in, as well as other information such as a time of each log-in, may additionally be utilized in the determination. The identified log-in activity information may be utilized to determine a probability that Entity A may be located at a particular location, and/or a probability that Entity A may be located a the particular location at particular times of day.

Alternatively, the ISP log-in data may be used to determine when an entity may not be contacted at a particular location and/or when a contact attempt may be associated with a lower probability of successful contact. In an exemplary embodiment, for instance, when the determination indicates that Entity A logs-in from a work location, contact with Entity A may not be attempted at Entity A's home. Rather, contact with Entity A may instead be attempted at the work location, for example, via a work telephone number, via a cellular telephone, via electronic mail, via instant messaging, and/or via any other suitable mechanism having a greater determined probability of successful contact with Entity A at the work location.

In the present application, Entity A may include, for example, an account holder or a prospective account holder, and may perform a process of logging-in. The process of logging-in may include more than accessing a web page or other interface and thereafter inputting identification data, for instance, a predefined string of numbers and/or characters, such as what is commonly referred to as a log-in name/number and password. Rather, the process of logging-in can also relate to accessing a web page or other interface without inputting such identification data. Further, the exemplary embodiments of the present application are equally applicable regardless of the communication device or devices used by Entity A to perform the log-in activity.

Figure 3:
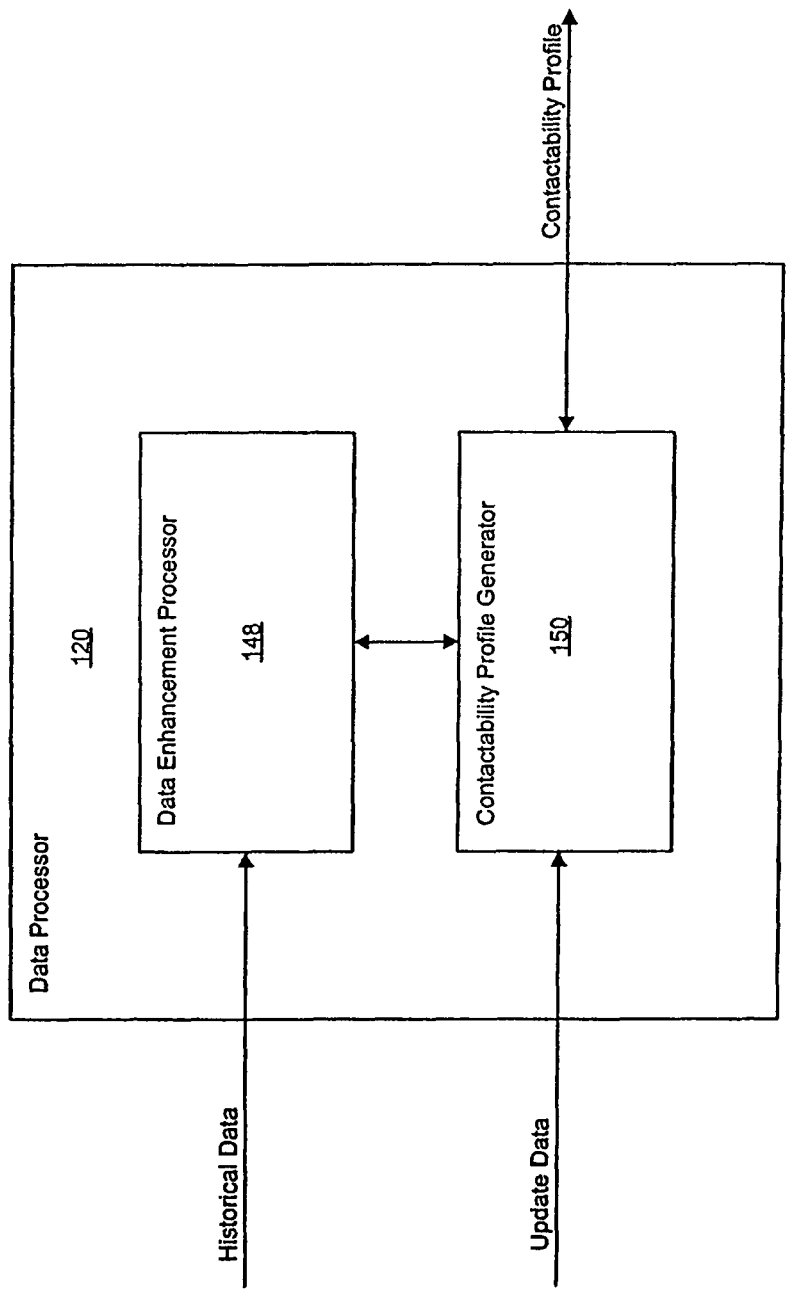
FIG. 3 shows a block diagram of an embodiment of a data processor shown in FIG. 1.

Referring now to FIG. 3, the data processor 120 may be configured to receive and/or retrieve the historical data from the historical database 102 and to process the received and/or retrieved historical data to generate at least one profile, for example, a contactability profile. It will be appreciated by one skilled in the art that numerous mechanisms exist which may be employed to implement the data processor 120. In an exemplary embodiment, as depicted in FIG. 3, the data processor 120 may include, for example, a data enhancement processor 148 and a contactability profile generator 150. The data processor 120 may also include an optional inference engine 151, as discussed below.

One function of the data enhancement processor 148 may be to enhance and/or process the historical data stored in the historical database 102 such that the stored data may be used to build the contactability profile. In an exemplary embodiment, for instance, the enhancement may include processing of data which are stored in the historical database 102 in a raw and/or unprocessed format. For instance, the enhancement processor 148 may interpret the raw and/or unprocessed stored data and generate conclusions based on characteristics of the raw and/or unprocessed data. Such processing may be implemented in a variety of ways, as would be appreciated by one skilled in the art.

Figure 4:
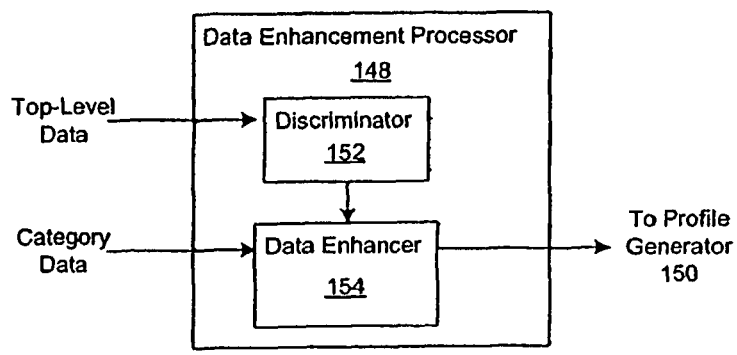
FIG. 4 shows a block diagram of an embodiment of a data enhancement processor shown in FIG. 3.
Figure 5:
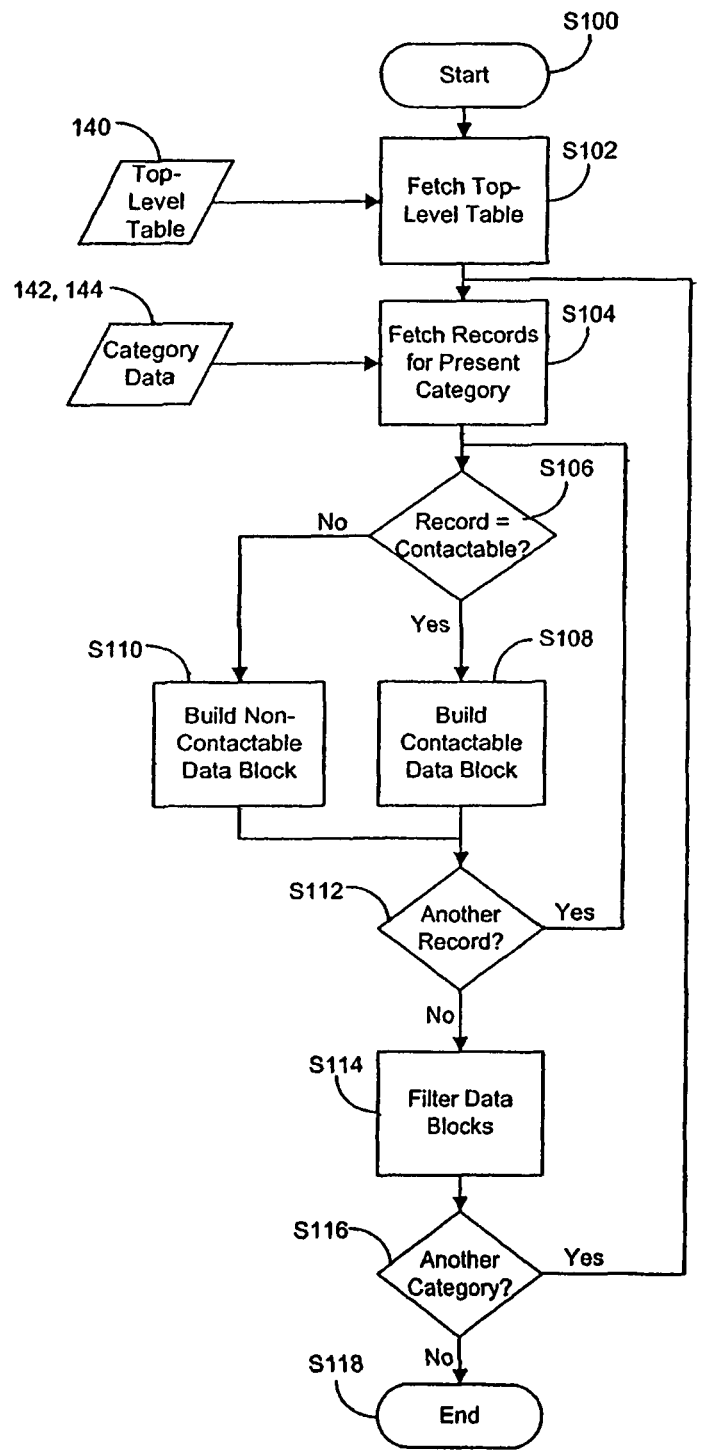
FIG. 5 shows a flowchart of a process performed by the processor shown in FIG. 3.

An embodiment of the data enhancement processor 148 is described below with reference to the embodiments illustrated in FIGS. 4 and 5. FIG. 4, for instance, shows a block diagram of the data enhancement processor 148, which may include a discriminator 152, a data enhancer 154, and a channel-spanning filter 156. FIG. 5, for instance, shows a flowchart illustrating enhancement processing that may be performed by the data enhancement processor 148.

The enhancement processing may begin at step S100, for example as a result of a command issued by a user or by a software application. At step S102, top-level table data for a particular entity may be transferred from the historical database 102 to the discriminator 152. As will be understood by one skilled in the art, the use of the term "transfer" in the present application is not intended to imply any limitation with respect to the disposition of the source data. That is, in alternate embodiments, a copy of the data in table 140 may remain in the database 102 after a transfer, analogous to a copy operation, or the data can be erased, deleted, and/or otherwise removed from the database 102 after or in association with the transfer. In the present embodiment, records from the top-level table 140 may be transferred at step S100. The discriminator 152 may evaluate the transferred records of table 140 to determine which categories of data are available in association with Entity A. The data enhancer 154 may then perform the processing loop from step S104 to step S116 for each category listed in the top-level table 140.

At step S104, the discriminator 152 may control the data enhancer 154 to fetch and/or collect records of the present category. For example, for the first instance of step S104 the records of the transaction card usage table 142 may be transferred to the data enhancer 154.

A records-processing loop from step S106 to step S112 may be included, wherein the data enhancer 154 may evaluate each of the records in the present category. At step S106, for instance, the data enhancer 154 may determine whether the record reflects contactable or non-contactable information. In an exemplary embodiment, for example, in the case of transaction card usage data, the usage data and/or patterns of the usage data may be interpreted to extrapolate information regarding whether the entity may be contactable via different channels. For instance, when the card is a membership card, times of usage of the card to visit a facility may be interpreted as times when the entity cannot be reached via a home phone number. Alternatively, when the card is a charge card, times of purchases performed at retailers can be interpreted as times when the entity may not be contactable at a home phone number, but may be reached at a mobile phone number.

Thus, it will be appreciated that many different types of data can be interpreted in various ways to generate contactable and/or non-contactable data. Additionally, as will be understood by one skilled in the art, the determinations described herein may additionally relate to determinations of probabilities of location of the entity in a particular location, and/or to determinations of probabilities of success associated with a contact attempt performed at a particular time.

In alternative embodiments, for example in the case of ISP log-in data, the usage data and/or patterns of the usage data can be interpreted to extrapolate information and/or determine whether the entity may be contactable via different communication channels. For instance, when Entity A makes a purchase via a merchant site located on the Internet at a particular time, then a determination may be made that Entity A is likely home and/or has a relatively greater probability of being home at that time of purchase. Additionally, a determination may be made that Entity A is therefore more likely to be located at home on another day at or approximately at the same time as the time of purchase. Therefore contact, via a channel such as a telephone call, to the home may be attempted and/or may be determined to be associated with a relatively higher level of contact success probability.

When the record is determined to be contactable information, for example in association with a positive or "Yes" at step S106, then the processing may continue to step S108. When the record is determined to be non-contactable information, for example in association with a negative or "No" at step S106, then the processing may continue to step S110.

At step S108, a data block of contactable information may be constructed. In an exemplary embodiment, for example, records of several successful telephone call contacts may be consolidated to provide blocks of times and days for which telephone call contacts have historically been successful. Similarly, at step S110, a data block of non-contactable information may be constructed to provide a consolidated record of times and days for which attempted telephone call contacts have historically been unsuccessful.

At step S112, a determination may be made regarding whether another record needs to be processed. When another record needs to be processed, for example in association with a positive or "Yes" at step S112, the processing may return to step S106 for processing of a next record. When another record does not need to be processed, for example in association with a negative or "No" at step S112, the process may continue by proceeding to step S114.

At step S114, the data enhancer 154 may filter the contactable data block using the non-contactable data block to enhance the quality of the contact data to be used to create a contactability profile. As will be understood by one skilled in the art, there may be many ways of performing such filtering.

Figure 6:
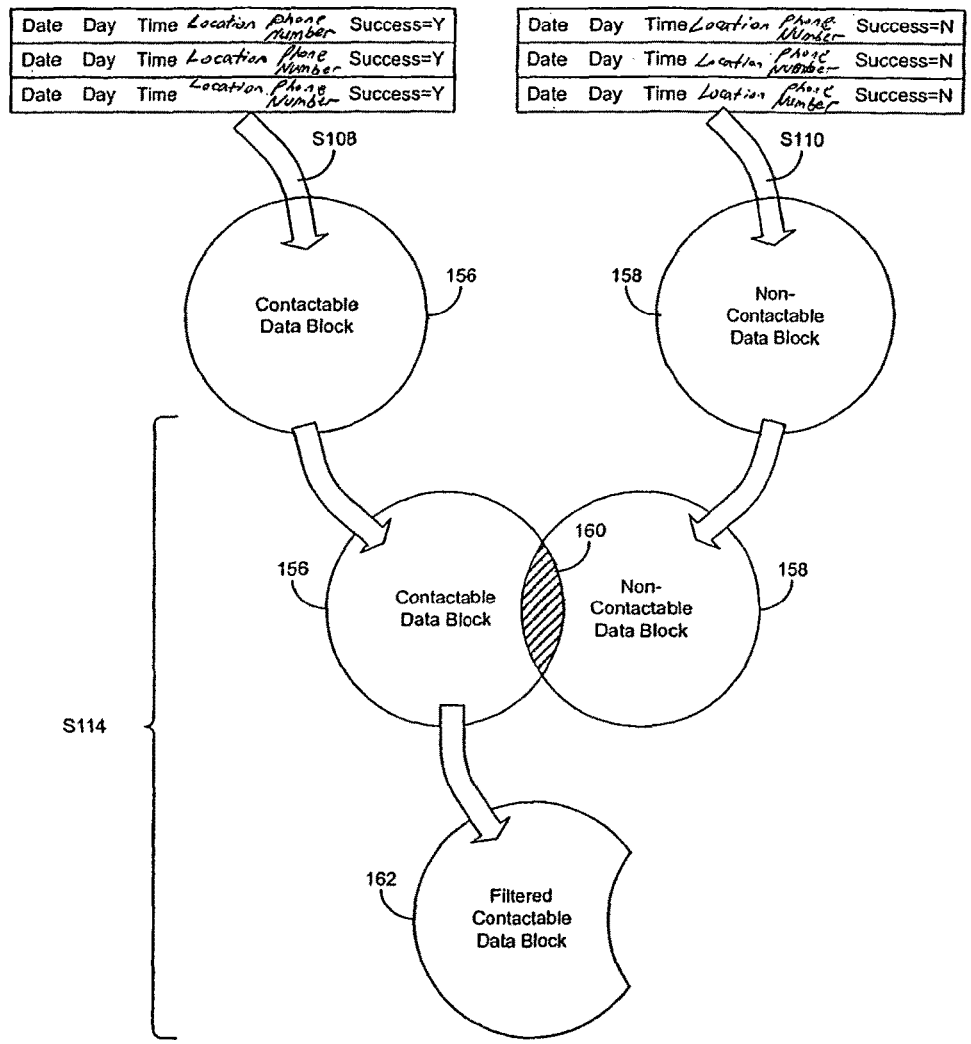
FIG. 6 shows a conceptual block diagram illustrating a portion of the process shown in FIG. 5.

In an exemplary embodiment, for example, the filtering may be performed as shown in FIG. 6, whereby a contactable data block 156 and a non-contactable data block 158 may be compared to detect intersection data 160. The intersection data 160 may include days and times associated with telephone call contact attempts which were successful as indicated by some records, but not successful as indicated by other records. For instance, Entity A may have been successfully contacted by telephone at a particular time, for example, at 5:00 pm on a Monday during a first week, but may have not been contactable via a telephone call made at 5:00 pm on a Monday three weeks later. The intersection data 160 may then be removed from the contactable data block 156 to derive a filtered contactable data block 162 containing data related to contactability characteristics of the present entity. Additionally, alternative embodiments may utilize interpolation techniques to evaluate and/or expand upon the data in each of the data blocks 156 and 158 in order to derive the contactability characteristic data in data block 162.

Figure 7:
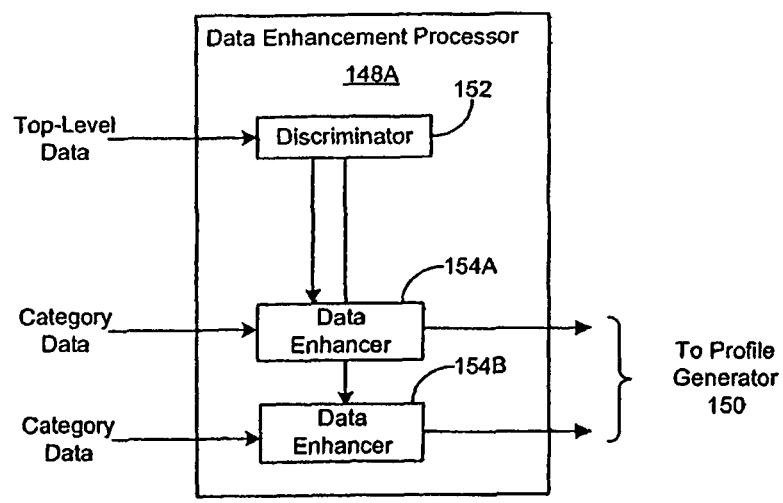
FIG. 7 shows a block diagram of an alternate embodiment of a data enhancement processor shown in FIG. 3.

An exemplary embodiment of the data enhancement processor 148 is shown in FIG. 7, as data enhancement processor 148A. In this embodiment, the single data enhancer 154 may be replaced with a plurality of data enhancers 154A, 154B, and each of the data enhancers 154A, 154B may be controlled by the discriminator 152. Upon receiving the top-level data from the historical database 102, the discriminator may activate one or more of the data enhancers 154A, 154B to perform parallel processing of the category data. That is, rather than having a single data enhancer 154 that may process each available category of data in series, for example by processing all of the transaction card usage data, and then processing all ISP log-in data, etc., the data enhancers 154A, 154B may each process a different category of data in parallel.

In the exemplary embodiment shown in FIG. 7, each of the data enhancers 154A, 154B may be customized to handle a specific category of data. In an exemplary embodiment, for example, data enhancer 154A may be designed to process transaction card usage data, and data enhancer 154B may be designed to process ISP log-in data. Providing category-specific data enhancers 154A, 154B may allow for greater flexibility in allowing for variations in types and numbers of fields for different categories of data, as illustrated for example in table 146 and table 148 in FIG. 2. Thus, as will be appreciated by one skilled in the art, there may be any number of data enhancers according to a number of anticipated possible categories of data.

Figure 8:
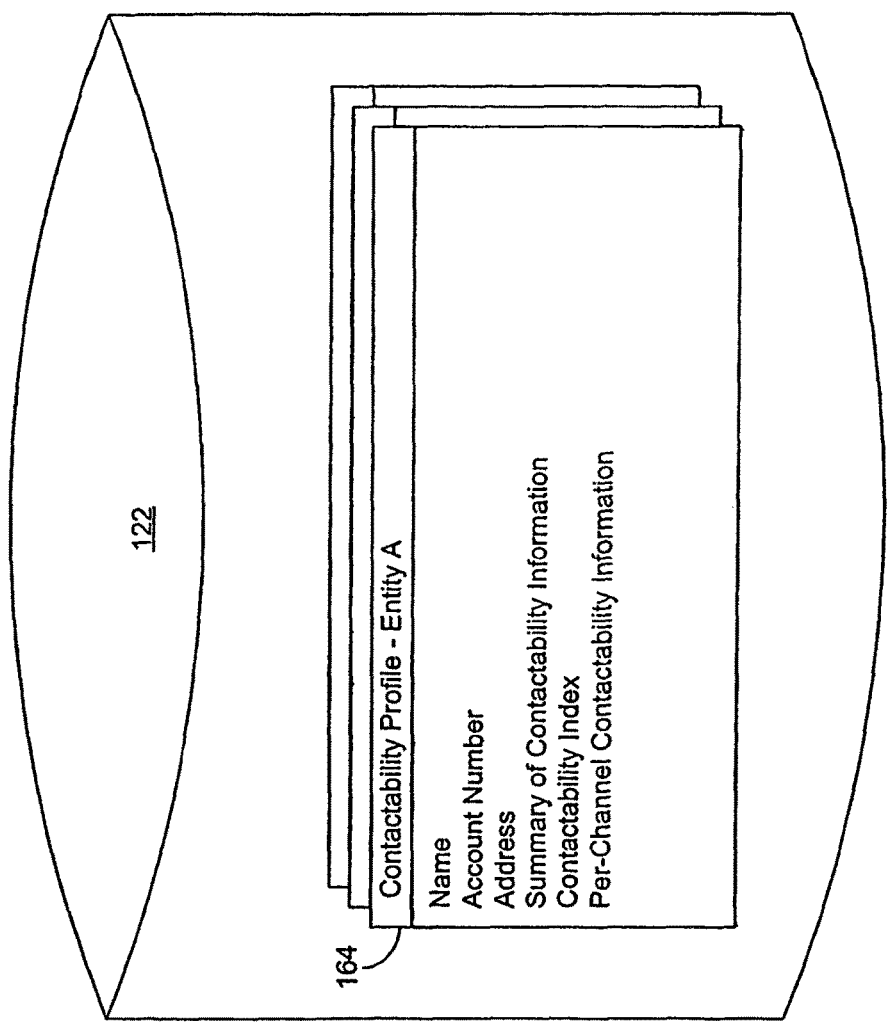
FIG. 8 shows a block diagram illustrating an example of profile data stored in a contactability profile database.

Referring back now to FIG. 3, enhanced contactability data that include contactability characteristics for a given entity may be transferred from the data enhancement processor 148 to the contactability profile generator 150. The contactability profile generator 150 may organize the contactability data into at least one contactability profile for the given entity. In an exemplary embodiment, for instance, the contactability profile generator 150 may receive the contactability data from the data enhancement processor 148, organize the contactability data into a new data table 164, and store the new data table 164 in the profile database 122, as shown in FIG. 8. In alternative exemplary embodiments, the contactability profile generator 150 may transform the contactability data into a format such as HTML, XML, XHTML, and the like, that can be viewed with and/or interpreted by a web browser as shown in FIG. 9 and/or stored in the profile database 122.

Figure 9:
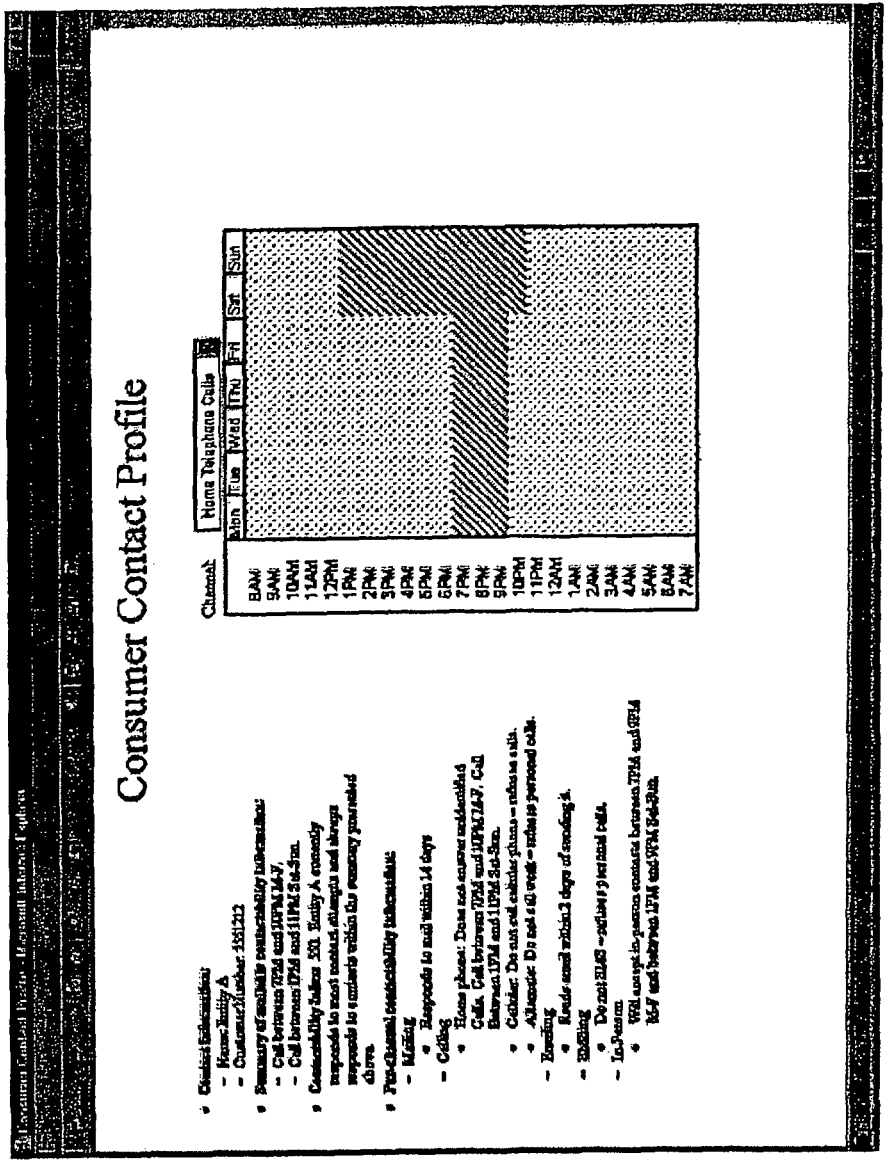
FIG. 9 shows an example of a contactability profile provided via a web-browser interface.

As shown in FIGS. 8 and 9, a contactability profile may include such information as, for example, a name, an account number, an address, a summary of contactability information, and per-channel and/or channel-specific contactability information for each entity. In an exemplary embodiment as shown in FIG. 9, the channel-specific contactability information can be viewed in textual and/or graphical form.

As shown in FIG. 3, the data processor may include an inference engine 151. The inference engine 151 may be used to make one or more inferences regarding an entity based on the historical data and/or the enhanced contactability data. For example, when data associated with an entity indicate that the entity has dial-up internet access, the inference engine may include a rule that infers that the entity also has a land-line telephone. Alternatively, the inference engine may include an indication of a relatively greater probability that the entity has a land-line telephone. When such a rule is included, the inference engine 151 can instruct the contactability profile generator 150 to update the entity's contactability profile to include "land-line telephone" as a potential contact channel. The inferences can be based on inference rules within the inference engine 151 or retrieved by the inference engine, for example from a database of inference rules.

The contactability profile may also include a contactability index. In an exemplary embodiment, the contactability index may be a numerical score, analogous to a credit score. For example, the contactability index can be a contactability score indicative of a likelihood that an entity can be contacted, and the contactability index may be structured such that a higher score may indicate that the entity is relatively more contactable, whereas a lower score may indicate that the entity is less contactable. The contactability index can be calculated by using scoring models and mathematical tables that assign points for different pieces of information, such as information provided in the historical database, which can be used to predict future contactability.

As shown in FIG. 3, the contact profile generator 150 may also receive update data for updating an existing contactability profile. For example, once a contactability profile has been created for Entity A, the contactability profile can be provided to Entity A for feedback and confirmation. Such feedback may result in a need to perform modifications to the contactability profile. In order to make such modifications, the contactability profile generator 150 may include capabilities to retrieve a contactability profile from the profile database 122, modify the profile, and store the modified profile in the profile database 122. In alternative exemplary embodiments, the contactability profile generator 150 may provide a user interface where a user can view and modify an existing contactability profile. In other embodiments, an existing profile may be retrieved by the contact profile generator 150 and provided to the data enhancement processor 148 for processing with new data received from the historical database 102.

It is contemplated that there may be many uses for the contactability profiles such as those described above. Such uses may include those illustrated in FIG. 1, including a call generator 124, an authorization request generator 126, a contactability profile portal 128, a contact plan generator 130, a schedule generator 132, a label generator 136, and a portfolio valuation system 138.

The call generator 124 may include a system that automatically places a telephone call based on information in a contactability profile. For example, the call generator 124 can receive for a particular entity a contactability profile that includes a name, phone number, and an optimal time block during which the entity can most likely be reached at the given telephone number. Based on that received information, the call generator 124 may schedule a telephone call during the optimal time block. When the time arrives, the call generator 124 can dial the given telephone number and detect if the call is answered. When answered, the call generator 124 may, for example, relay a recorded or computer-generated message or connect a user to the answered telephone call.

The authorization generator 126 can be a system that processes and/or generates an authorization based at least in part on information provided by a contactability profile. For example, the authorization may be related to approving an application for a membership, approving an application for credit, or any other type of request. In some embodiments, the authorization generator 126 may compare the contactability index provided for a certain entity to a predetermined contactability threshold and make a determination as to whether to approve a certain request based on the comparison. In other embodiments, an authorization may be conditionally approved based on the contactability index. For example, in the case of a loan or credit request, if a contactability index is too low the request can be denied, otherwise the request can be approved with terms or conditions of the loan or credit (e.g., loan/credit amount and/or interest rate) being adjusted depending on an applicant's contactability index. Similarly, the contactability index can be used to establish or adjust credit terms, for example minimum down payment, interest rate, or credit limit/loan amount, where more desirable terms can be offered to entities having a higher contactability index, and consequently being associated with a relatively greater probability of contact. In the exemplary embodiments of the present application, a credit bureau system can be consulted and/or an internal model can be utilized for determining loan and/or credit requests.

The contactability profile portal 128 can be a web-based portal that provides authorized users access to contactability profiles over a communication network, such as the Internet. In some embodiments, to access contactability profiles a user can use a conventional personal or desktop computer running a conventional web browser software application (e.g., applications such as Mozilla, FireFox, Netscape Navigator, or Microsoft Internet Explorer) or a mobile or wireless device having web-browsing capability. The user interface is preferably written in a standard mark-up language such as HTML, and may be implemented without using vendor-specific additions to the standard markup language so as to support access from as many types of browsers as possible. To support encryption of personal information that might be included in a contactability profile, the portal 128 can use a Secure Socket Layer ("SSL") connection when communicating with the profile database 122 and with users connecting to the portal 128. The portal 128 can include security features, for example requiring users to provide login information before access to contactability profiles is allowed. To provide for display of a contactability profile in a web browser, the profiles can be stored in the profile database 122 in a markup language or other format suitable for instructing a web browser to generate a display. Alternatively, the profiles can be retrieved from the profile database 122 as raw data and converted by the portal 128 into the desired format for use by a web browser.

The contact plan generator 130 can be a system for planning any type of contact with an entity whose contactability profile is available from the profile database 122. For example, the contact plan generator 130 can be a system for scheduling telephone calls/conferences, personal meetings, email, instant messages, deliveries, or any other type of contact. In some embodiments, the contact plan generator 130 can be instructed to schedule contact with a particular entity, such as Entity A. The contact plan generator 130 can retrieve a contactability profile for Entity A from the profile database 122. The contact plan generator 130 can then generate a plan or series of options for contacting Entity A based on information provided in the contactability profile.

For example, if a user instructs the contact plan generator 130 to plan a telephone call to Entity A, the contact plan generator 130 can use the information in the contactability profile for Entity A to plan the telephone call during a period of time when Entity A is relatively more likely to answer the telephone at a particular location. Alternatively, the contact plan generator 130 can provide the user with a list or block of times that are optimal for telephoning Entity A, and the user can select from the provided list in order to confirm the contact plan. In other exemplary embodiments, the user can instruct the contact plan generator 130 to determine a best channel for contacting Entity A on a specific day, at a specific time, and/or at a specific location. The contact plan generator 130 can evaluate the contactability profile to determine which channels, if any, Entity A can typically be contacted through for the given day and/or time. Based on this evaluation, the contact plan generator 130 can report to the user a channel or list of channels to select from for making contact, or may inform the user when the day and/or time provided is not normally a day/time at which Entity A can be contacted or at which a relatively low probability of contact may exist.

The contact plan generator 130 can also inform the user when certain options, such as channels, times, and the like, are economically advantageous. For example, if Entity A may be contacted both by email and by telephone during a certain block of time, and contact by email costs less than contact by telephone, the contact plan generator 130 can provide a recommendation that contact be attempted and/or performed via email instead of by telephone.

The contact plan generator 130 can also select an entity or list of entities from the profile database 122 that may be associated with relatively better and/or more favorable choices to attempt to contact for a given parameter or set of parameters. For example, for a given time slot, such as between 4:00 pm and 5:00 pm, and for a given channel, such as telephone, the contact plan generator 130 can generate a list of entities most likely to be contacted. This may be accomplished by receiving a set of parameters, for example as in this case a time block and a channel, then querying the profile database 122 to search for entities that can likely be contacted based on their contactability information. In some embodiments, the contact plan generator 130 can prioritize the list based on a contactability index.

The schedule generator 132 may be similar in structure and/or operation to the contact plan generator 130, differing in that the schedule generator 132 can generate a series of contacts for an extended period of time. For example, the schedule generator 132 can create a calendar spanning a specified period of time, such as a day, week, month, and the like, and can schedule contacts with one or more entities during that period of time according to optimal contact times determined from evaluation of contactability profiles.

The label generator 136 can include a system for generating labels, such as shipping labels, that include information indicative of an optimal contact day, time, or other parameter. For example, when used in connection with a parcel delivery service, the label generator 136 can retrieve a contactability profile for an entity to which a parcel is to be delivered. The label generator 136 can evaluate the contactability profile to determine an optimal time or block of time during which the receiving entity may be relatively more likely, for instance, to be available to receive the delivery. The label generator 136 can then generate a shipping label, for example via a printer, that may be affixed to the parcel or other item to be delivered. The generated shipping label may include information for the delivery service to use for planning a delivery. The contactability information on the shipping label may be simple text, or may be encoded, for example in the form of a barcode. In an alternative exemplary embodiment, the shipping contactability information may be stored in a radio frequency identification ("RFID") transmitter, and the RFID transmitter may be embedded within and/or attached to a shipping label on a delivery item. The encoding can be such that a scanning device can scan the encoded information and generate data, for example, that can be processed for scheduling a delivery or for generating a display of delivery information.

Figure 10:
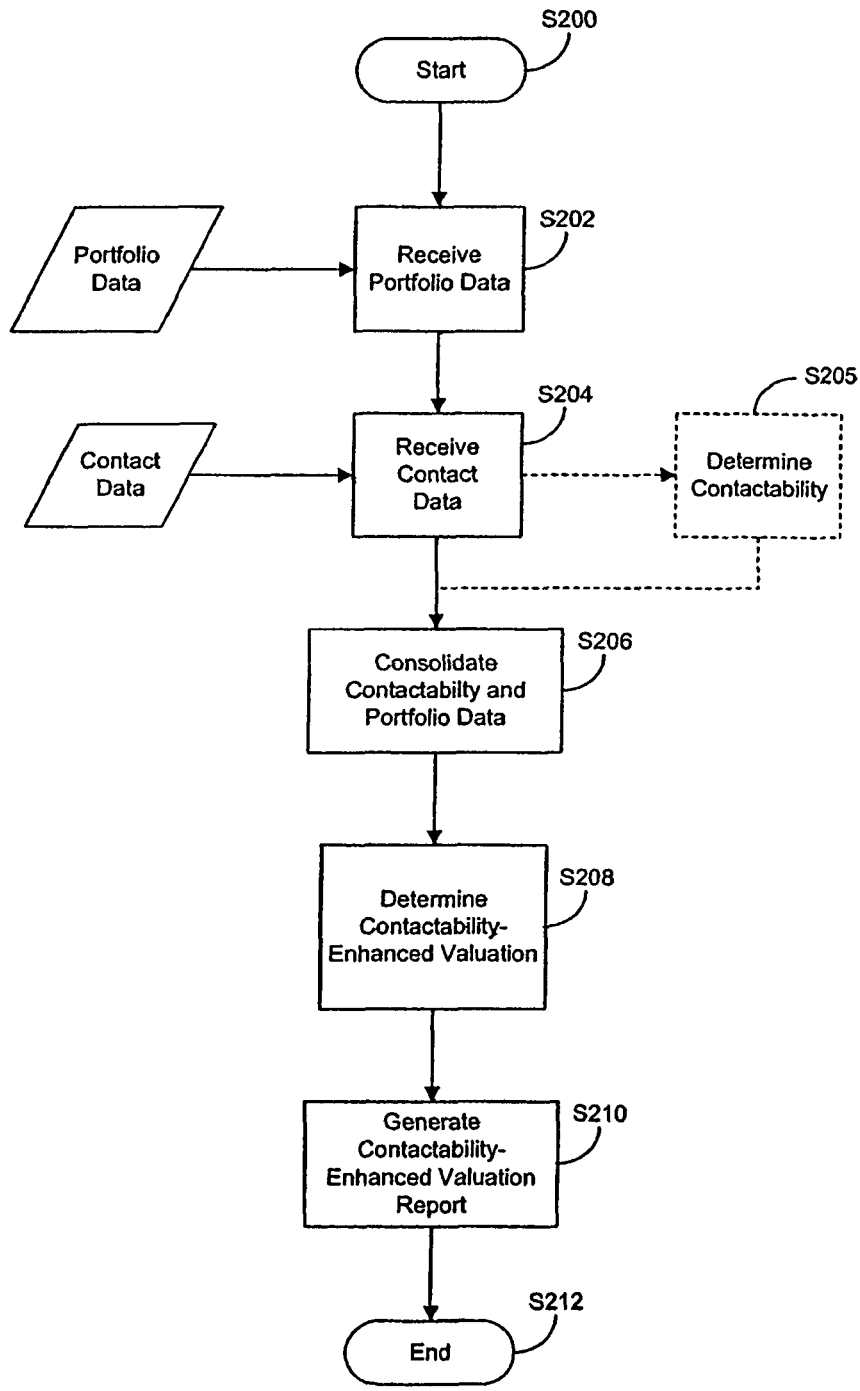
FIG. 10 shows a flowchart of a process for determining a portfolio valuation.

The portfolio valuation system 138 can be a system for determining, adjusting, and/or enhancing a valuation of a portfolio, for example a debt portfolio. Implementations of the portfolio valuation system 138 can vary, including for instance computer systems (e.g., servers, personal computers, handheld computers, personal digital assistants, tablet personal computers, smart phones, cellular telephones, etc.), computer software products, web portals, web services, and the like. Implementations of the portfolio valuation system 138 can include systems used by an organization to value one or more of its own portfolios, or systems used by a third-party for valuing portfolios of other organizations. In some embodiments, the valuation system 138 can perform a valuation process according to the flowchart shown in FIG. 10. The process may begin at step S200. At step S202, the valuation system 138 may receive portfolio data. The portfolio data can be received from any source, including electronic storage and/or manual entry. The portfolio data can be data descriptive of a debt portfolio sufficient to value a debt portfolio according to methods known by those skilled in the art, for example in association with a history and/or an age of loans in the portfolio, a remaining time to maturity, loan amounts, interest rates, borrower's credit worthiness, geographic locations, and/or underlying collateral types. In some cases, the portfolio data can include a previously-calculated or preliminary portfolio valuation.

Next, at step S204 the portfolio valuation system 138 may receive contact data. In some embodiments, the contact data include a contactability profile received from the profile database 122 or some other source. Step S204 can include receiving contact data for one or more entities. For example, the portfolio data can be data for a group of loans issued to several different entities, in which case at step S204 contact data for one or more of those entities may be received.

At step S206, the valuation system 138 may consolidate the contact data and the portfolio data. Step S206 can include a verification process to assure that the contact data received at step S204 is associated with the portfolio data received at step S202. For example, the verification process can involve comparison of a name, account number, address, phone number, and/or other information included in the portfolio data to that which is included in the contact data to verify an association.

At step S208, the valuation system 138 may calculate a value for the portfolio using the combination of the contact data and the portfolio data. In some embodiments, a preliminary valuation can be calculated based on the portfolio data according to methods known to those skilled in the art. The preliminary valuation can then be adjusted based on the contactability of the entities associated with the portfolio. For example, the contact data can include at least one contactability index for each of the associated entities. The contactability indices can be used to calculate an overall contactability index for the portfolio (e.g., by calculating an average, a weighted average, or by some other calculation). The preliminary valuation can then be increased or decreased based on the overall contactability index. For instance, a higher contactability index indicative of highly-contactable borrowers can result in increased valuation and vice-versa.

At step S210, a contactability-enhanced valuation report may be generated. This report can include a monetary value for the portfolio under consideration. This report can also include information that can be used to calculate a monetary value for the portfolio under consideration and/or to facilitate a decision regarding the portfolio, such as whether the portfolio should be purchased, sold, or traded. The report can be generated in any form, including generation of a paper or electronic document. The process may end at step S212.

Figure 11:
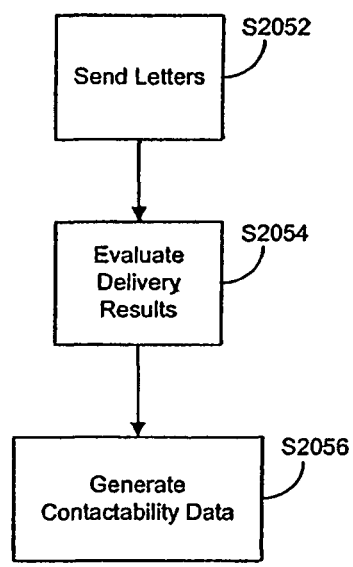
FIG. 11 shows a flowchart of a process for determining contactability according to an optional step in the process shown in FIG. 10.

In an alternative embodiment, the contact data in step S204 can be historical data, in which case an optional step S205 may be included for determining contactability of the entity or entities associated with the debt portfolio. For example, in one embodiment step S205 may include performing a contactability determination process as shown in FIG. 11. As shown in FIG. 11, the contactability determination process begins at step S2052 where high-capability letters, for instance including letters that can be tracked and/or must be signed for, are sent to a some or all of the entities associated with the portfolio. In step S2054, an evaluation may be made regarding a success of the attempted letter deliveries. This evaluation can include calculation of a number or percentage of letters delivered, delivered to a particular individual, returned, or forwarded. The results of this evaluation may then be used to generate contactability data for the portfolio at step S2056. In some embodiments, step S2056 can be accomplished using a process such as that described above in connection with FIG. 5. In further embodiments, step S2056 can involve calculation of a contactability index for the portfolio based on the evaluation made in step S2054. After completion of step S2056, the process can continue to step S206 in FIG. 10.

In alternative exemplary embodiments, the portfolio valuation system 138 can be a system for determining, adjusting or enhancing any type of portfolio or entity list. For example, lists of clients, organizations, subscribers, for example magazine subscribers, call-lists (e.g., lists used by telemarketers or pollsters), or customer lists.

While various embodiments of methods and systems in accordance with the principles disclosed herein have been described above, it should be understood that they have been presented by way of example only, and are not limiting. Thus, the breadth and scope of the present application should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A system for improving call center efficiency based on a contactability profile of an entity, comprising:
   at least one memory configured to store data and instructions;
   at least one processing unit configured to access the at least one memory and execute the instructions, causing the at least one processing unit to:
   generate a contactability profile of an entity by:
      receiving, from a transaction system, transaction card usage data associated with the entity, the transaction card usage data comprising a transaction date and time and a transaction channel associated with each of a plurality of transactions;
      receiving, from a plurality of data sources, internet usage data associated with the entity's access to a plurality of webpages, the internet usage data comprising an access time and an access channel for each of the plurality of webpages;
      extrapolating, by a discriminator controlling a plurality of data enhancers and based on the transaction card usage data and internet usage data, contactability data including both contactable times and channels and non-contactable times and channels;
      filtering the contactability data to remove conflicting contactability data indicating that the entity is both contactable and noncontactable at a same period of time; and calculating, based on the filtered contactability data, a plurality of probabilities that the entity will be available for contact at a respective specified time and via one or more communication channels, store, in the at least one memory, the contactability profile including a block of time indicating a calculated probability that the entity will be available at a specified time and via a specified channel; and a call generator system configured to:
receive the contactability profile of the entity;
schedule a telephone call during the block of time provided by the contactability profile;
dial a telephone number provided in the contactability profile during the block of time;
detect that the telephone call is answered by the entity; and
connect a user to the answered telephone call.

2. The system of claim 1, wherein the instructions, when executed by the at least one processing unit, further causes the at least one processing unit to:
receive a transaction card usage data record representative of an authorization request;
process the transaction card usage data record to identify contactability information or noncontactability information; and
update a first contactable data block of the plurality of selectable blocks based on the identified contactability and noncontactability information.

3. The system of claim 1, wherein the instructions, when executed by the at least one processing unit, further causes the at least one processing unit to:
receive an update to the transaction card usage data or the internet usage data; and
modify one or more of the plurality of selectable time blocks based on the update.

4. The system of claim 1, wherein the instructions, when executed by the at least one processing unit, further causes the at least one processing unit to:
receive, as part of the transaction card usage data or the internet usage data, location information indicative of a location where transaction card usage or the internet usage occurred.

5. The system of claim 4, wherein the received location information is associated with a primary residence of the entity and the contactability or noncontactability data indicates whether the entity is available for contact at the primary residence.

6. A system for improving call center efficiency based on a contactability profile of an entity, comprising:
at least one memory configured to store data and instructions; and
at least one processing unit configured to access the at least one memory and execute the instructions, causing the at least one processing unit to:
generate a contactability profile of an entity by:
receiving, from a transaction system, transaction card usage data associated with the entity, the transaction card usage data comprising a transaction date and time and a transaction channel associated with each of a plurality of transactions;
receiving, from a plurality of data sources, internet usage data associated with the entity's access to a plurality of webpages, the internet usage data comprising an access time and an access channel for each of the plurality of webpages;
extrapolating, by a discriminator controlling a plurality of data enhancers and based on the transaction card usage data and internet usage data, contactability data including both contactable times and channels and non-contactable times and channels;
filtering the contactability data to remove conflicting contactability data indicating that the entity is both contactable and noncontactable at a same period of time; and
calculating, based on the filtered contactability data, a plurality of probabilities that the entity will be available for contact at a respective specified time and via one or more communication channels, wherein the contactability profile includes a block of time for the entity, indicating a calculated probability that the entity will be available at a specified time and via a specified channel;
store, in the at least one memory, the contactability profile; and
a call generator system configured to:
receive the contactability profile of the entity;
schedule a telephone call during the block of time provided by the contactability profile;
dial a telephone number provided in the contactability profile during the block of time;
detect that the telephone call is answered by the entity; and
connect a user to the answered telephone call.

7. The system of claim 6, wherein the instructions, when executed by the at least one processing unit, further causes the at least one processing unit to:
identify, using the contactability profile, a plurality of times and a plurality of channels in which the entity is contactable; and
generate, using a contact plan generator, a contact plan comprising instructions to contact the entity at the plurality of times and via the plurality of channels.

8. The system of claim 7, wherein the contact plan further comprises information indicative of whether contacting the entity at the plurality of times and via the plurality of channels is economically advantageous.

9. The system of claim 6, wherein the instructions, when executed by the at least one processing unit, further causes the at least one processing unit to:
receive, via the interface, an indication of a request to contact the entity using a second channel of the one or more communication channels; and
generate, using a contact plan generator and using on the contactability profile, a contact plan comprising one or more time and date options for contacting the entity using the second channel.

10. The system of claim 6, wherein the instructions, when executed by the at least one processing unit, further causes the at least one processing unit to:
receive, via the interface, an indication of a request to generate a contact schedule to contact a plurality of entities;
generate, using a schedule generator and using a plurality of contactability profiles associated with a plurality of entities, a contact calendar comprising indications to contact respective entities of the plurality of entities at respective time and over respective channels; and
output, via the interface, a representation of the contact calendar.

11. The system of claim 6, wherein the instructions, when executed by the at least one processing unit, further causes the at least one processing unit to:
  determine that the contactability data indicates a contactable time and channel on the same date as the transaction card usage data or internet usage data; and
  output, via the interface, a selectable prompt to contact the entity at the indicated contactable time and channel.

12. The system of claim 6, wherein the instructions, when executed by the at least one processing unit, further causes the at least one processing unit to:
  receive a transaction card usage data record representative of an authorization request;
  process the transaction card usage data record to identify contactability information or noncontactability information; and
  update a first contactable data block of the plurality of selectable blocks based on the identified contactability and noncontactability information.

13. The system of claim 6, wherein the instructions, when executed by the at least one processing unit, further causes the at least one processing unit to:
  receive an update to the transaction card usage data or the internet usage data; and
  update one or more of the plurality of selectable time blocks based on the update.

14. The system of claim 6, wherein the instructions, when executed by the at least one processing unit, further causes the at least one processing unit to:
  receive, as part of the transaction card usage data or the internet usage data, location information indicative of a location where the transaction card usage or the internet usage occurred.

15. The system of claim 14, wherein the received location information is associated with a primary residence of the entity and the contactability or noncontactability data indicates whether the entity is available for contact at the primary residence.

16. The system of claim 15, wherein the at last one processing unit is further configured to:
  contact the entity at the primary residence based on the contactability data indicating that the entity is available at the primary residence, the primary residence being associated with the first channel.

17. The system of claim 15, wherein the at last one processing unit is further configured to:
  contact the entity away from the primary residence based on the contactability data indicating that the entity is remote from the primary residence, the primary residence being unassociated with the first channel.

18. A system for improving call center efficiency based on a contactability profile of an entity, comprising:
  at least one memory configured to store data and instructions; and
  at least one processing unit configured to access the at least one memory and execute the instructions, causing the at least one processing unit to:
    generate a contactability profile of an entity by:
      receiving, from a transaction system, transaction card usage data associated with the entity, the transaction card usage data comprising a transaction date and time, transaction location, and a transaction channel associated with each of a plurality of transactions;
      receiving, from a plurality of data sources, internet usage data associated with the entity's access to a plurality of webpages, the internet usage data comprising an access time and an access channel for each of the plurality of webpages;
      extrapolating, by a discriminator controlling a plurality of data enhancers and based on the transaction card usage data and internet usage data, contactability data including both contactable times and channels and non-contactable times and channels;
      filtering the contactability data to remove conflicting contactability data indicating that the entity is both contactable and noncontactable at a same period of time; and
      calculating, based on the filtered contactability data, a plurality of probabilities that the entity will be available for contact at a respective specified time and via one or more communication channels; wherein
    store, in the at least one memory, the contactability profile;
    determine that the contactability data indicates a contactable time and channel on a same date as the transaction card usage data or internet usage data;
    determine a first block of time to contact the entity based on the contactability data; and
  a call generator system configured to:
    receive the contactability profile of the entity;
    schedule a telephone call during the first block of time;
    dial a telephone number provided in the contactability profile during the first block of time;
    detect that the telephone call is answered by the entity; and
    connect a user to the answered telephone call.

19. The system of claim 17, wherein the instructions, when executed by the at least one processing unit, further causes the at least one processing unit to:
  receive the transaction card usage data record based on an authorization request;
  process the transaction card usage data to identify contactability information or noncontactability information; and
  update a first contactable data block of the plurality of selectable blocks based on the identified contactability and noncontactability information.

20. The system of claim 17, wherein
  the received location information is associated with a primary residence of the entity and the contactability or noncontactability data indicates whether the entity is available for contact at the primary residence, and
  the at last one processing unit is further configured to contact the entity at the primary residence based on the contactability data indicating that the entity is available at the primary residence, the primary residence being associated with the first channel.

* * * * *